United States Patent
Davis et al.

(10) Patent No.: US 9,054,990 B2
(45) Date of Patent: Jun. 9, 2015

(54) SYSTEM AND METHOD FOR DATA CENTER SECURITY ENHANCEMENTS LEVERAGING SERVER SOCS OR SERVER FABRICS

(75) Inventors: Mark Davis, Austin, TX (US); Jason Hobbs, Leander, TX (US); David Borland, Austin, TX (US); Danny Marquette, Austin, TX (US); Tom Volpe, Austin, TX (US); Ken Goss, Round Rock, TX (US)

(73) Assignee: III Holdings 2, LLC, Wilmington, DE (US)

(*) Notice: Subject to any disclaimer, the term of this patent is extended or adjusted under 35 U.S.C. 154(b) by 132 days.

(21) Appl. No.: 13/475,713

(22) Filed: May 18, 2012

(65) Prior Publication Data

US 2012/0297042 A1    Nov. 22, 2012

Related U.S. Application Data

(63) Continuation-in-part of application No. 12/794,996, filed on Jun. 7, 2010.

(60) Provisional application No. 61/489,569, filed on May 24, 2011, provisional application No. 61/256,723, filed on Oct. 30, 2009.

(51) Int. Cl.
| H04L 12/28 | (2006.01) |
| H04L 12/935 | (2013.01) |
| H04L 12/773 | (2013.01) |
| H04L 12/933 | (2013.01) |
| H04L 12/931 | (2013.01) |

(52) U.S. Cl.
CPC ............ *H04L 49/3009* (2013.01); *H04L 45/60* (2013.01); *H04L 49/109* (2013.01); *H04L 49/351* (2013.01); *H04L 49/356* (2013.01)

(58) Field of Classification Search
CPC ..... H04L 12/56; H04L 2012/56; H04L 45/02; H04L 45/04; H04L 45/10
USPC .................................................. 370/389, 400
See application file for complete search history.

(56) References Cited

U.S. PATENT DOCUMENTS

| 5,451,936 | A | 9/1995 | Yang et al. |
| 5,594,908 | A | 1/1997 | Hyatt |
| 5,781,187 | A | 7/1998 | Gephardt et al. |
| 5,908,468 | A | 6/1999 | Hartmann |
| 5,968,176 | A | 10/1999 | Nessett et al. |
| 5,971,804 | A | 10/1999 | Gallagher et al. |

(Continued)

FOREIGN PATENT DOCUMENTS

| JP | 2005-223753 | 8/2005 |
| JP | 2005-536960 | 12/2005 |

(Continued)

OTHER PUBLICATIONS

PCT/US2010/053227 International Preliminary Report on Patentability dated May 10, 2012 (2 pages).

(Continued)

*Primary Examiner* — Afshawn Towfighi

(57) ABSTRACT

A data center security system and method are provided that leverage server systems on a chip (SOCs) and/or server fabrics. In more detail, server interconnect fabrics may be leveraged and extended to dramatically improve security within a data center.

47 Claims, 8 Drawing Sheets

(56) References Cited

U.S. PATENT DOCUMENTS

| | | | |
|---|---|---|---|
| 6,141,214 A | 10/2000 | Ahn | |
| 6,181,699 B1 | 1/2001 | Crinion et al. | |
| 6,192,414 B1 | 2/2001 | Horn | |
| 6,373,841 B1 | 4/2002 | Goh et al. | |
| 6,446,192 B1 | 9/2002 | Narasimhan et al. | |
| 6,452,809 B1 | 9/2002 | Jackson et al. | |
| 6,507,586 B1 | 1/2003 | Satran et al. | |
| 6,574,238 B1 | 6/2003 | Thrysoe | |
| 6,711,691 B1 | 3/2004 | Howard et al. | |
| 6,766,389 B2 | 7/2004 | Hayter et al. | |
| 6,813,676 B1 | 11/2004 | Henry et al. | |
| 6,816,750 B1 | 11/2004 | Klaas | |
| 6,842,430 B1 | 1/2005 | Melnik | |
| 6,857,026 B1 | 2/2005 | Cain | |
| 6,963,926 B1 | 11/2005 | Robinson | |
| 6,963,948 B1 | 11/2005 | Gulick | |
| 6,977,939 B2 | 12/2005 | Joy et al. | |
| 6,988,170 B2 | 1/2006 | Barroso et al. | |
| 6,990,063 B1 | 1/2006 | Lenoski et al. | |
| 7,020,695 B1 | 3/2006 | Kundu et al. | |
| 7,032,119 B2 | 4/2006 | Fung | |
| 7,080,078 B1 | 7/2006 | Slaughter et al. | |
| 7,080,283 B1 | 7/2006 | Songer et al. | |
| 7,143,153 B1 | 11/2006 | Black et al. | |
| 7,165,120 B1 | 1/2007 | Giles et al. | |
| 7,170,315 B2 | 1/2007 | Bakker et al. | |
| 7,203,063 B2 | 4/2007 | Bash et al. | |
| 7,257,655 B1 | 8/2007 | Burney et al. | |
| 7,263,288 B1 | 8/2007 | Islam | |
| 7,274,705 B2 | 9/2007 | Chang et al. | |
| 7,278,582 B1 | 10/2007 | Siegel et al. | |
| 7,310,319 B2 * | 12/2007 | Awsienko et al. | 370/254 |
| 7,325,050 B2 | 1/2008 | O'Connor et al. | |
| 7,337,333 B2 | 2/2008 | O'Conner et al. | |
| 7,340,777 B1 | 3/2008 | Szor | |
| 7,353,362 B2 | 4/2008 | Georgiou et al. | |
| 7,382,154 B2 | 6/2008 | Ramos et al. | |
| 7,386,888 B2 | 6/2008 | Liang et al. | |
| 7,418,534 B2 | 8/2008 | Hayter et al. | |
| 7,437,540 B2 | 10/2008 | Paolucci et al. | |
| 7,447,147 B2 | 11/2008 | Nguyen et al. | |
| 7,447,197 B2 | 11/2008 | Terrell et al. | |
| 7,466,712 B2 | 12/2008 | Makishima et al. | |
| 7,467,306 B2 | 12/2008 | Cartes et al. | |
| 7,467,358 B2 | 12/2008 | Kang et al. | |
| 7,502,884 B1 | 3/2009 | Shah et al. | |
| 7,519,843 B1 | 4/2009 | Buterbaugh et al. | |
| 7,555,666 B2 | 6/2009 | Brundridge et al. | |
| 7,583,661 B2 | 9/2009 | Chaudhuri | |
| 7,586,841 B2 | 9/2009 | Vasseur | |
| 7,596,144 B2 | 9/2009 | Pong | |
| 7,599,360 B2 | 10/2009 | Edsall et al. | |
| 7,606,225 B2 | 10/2009 | Xie et al. | |
| 7,606,245 B2 | 10/2009 | Ma et al. | |
| 7,616,646 B1 | 11/2009 | Ma et al. | |
| 7,620,057 B1 | 11/2009 | Aloni et al. | |
| 7,657,677 B2 | 2/2010 | Huang et al. | |
| 7,657,756 B2 | 2/2010 | Hall | |
| 7,660,922 B2 | 2/2010 | Harriman | |
| 7,673,164 B1 | 3/2010 | Agarwal | |
| 7,710,936 B2 | 5/2010 | Morales Barroso | |
| 7,719,834 B2 | 5/2010 | Miyamoto et al. | |
| 7,751,433 B2 | 7/2010 | Dollo et al. | |
| 7,760,720 B2 | 7/2010 | Pullela et al. | |
| 7,761,687 B2 | 7/2010 | Blumrich et al. | |
| 7,783,910 B2 | 8/2010 | Felter et al. | |
| 7,791,894 B2 | 9/2010 | Bechtolsheim | |
| 7,792,113 B1 | 9/2010 | Foschiano et al. | |
| 7,796,399 B2 | 9/2010 | Clayton et al. | |
| 7,801,132 B2 | 9/2010 | Ofek et al. | |
| 7,802,017 B2 | 9/2010 | Uemura et al. | |
| 7,831,839 B2 | 11/2010 | Hatakeyama | |
| 7,840,703 B2 | 11/2010 | Arimilli et al. | |
| 7,865,614 B2 | 1/2011 | Lu et al. | |
| 7,925,795 B2 | 4/2011 | Tamir et al. | |
| 7,975,110 B1 | 7/2011 | Spaur et al. | |
| 7,991,817 B2 | 8/2011 | Dehon et al. | |
| 7,991,922 B2 | 8/2011 | Hayter et al. | |
| 7,992,151 B2 | 8/2011 | Warrier et al. | |
| 8,019,832 B2 | 9/2011 | De Sousa et al. | |
| 8,060,760 B2 | 11/2011 | Shetty et al. | |
| 8,060,775 B1 | 11/2011 | Sharma et al. | |
| 8,108,508 B1 | 1/2012 | Goh et al. | |
| 8,122,269 B2 | 2/2012 | Houlihan et al. | |
| 8,132,034 B2 | 3/2012 | Lambert et al. | |
| 8,156,362 B2 | 4/2012 | Branover et al. | |
| 8,170,040 B2 | 5/2012 | Konda | |
| 8,180,996 B2 | 5/2012 | Fullerton et al. | |
| 8,189,612 B2 | 5/2012 | Lemaire et al. | |
| 8,199,636 B1 | 6/2012 | Rouyer et al. | |
| 8,205,103 B2 | 6/2012 | Kazama et al. | |
| 8,379,425 B2 | 2/2013 | Fukuoka et al. | |
| 8,397,092 B2 | 3/2013 | Karnowski | |
| RE44,610 E | 11/2013 | Krakirian et al. | |
| 8,684,802 B1 | 4/2014 | Gross et al. | |
| 8,745,275 B2 | 6/2014 | Ikeya et al. | |
| 8,745,302 B2 | 6/2014 | Davis et al. | |
| 8,782,321 B2 | 7/2014 | Harriman et al. | |
| 8,824,485 B2 | 9/2014 | Biswas et al. | |
| 8,854,831 B2 | 10/2014 | Arnouse | |
| 2002/0004912 A1 | 1/2002 | Fung | |
| 2002/0040391 A1 | 4/2002 | Chaiken et al. | |
| 2002/0083352 A1 | 6/2002 | Fujimoto et al. | |
| 2002/0097732 A1 | 7/2002 | Worster et al. | |
| 2002/0107903 A1 | 8/2002 | Richter et al. | |
| 2002/0124128 A1 | 9/2002 | Qiu | |
| 2002/0159452 A1 * | 10/2002 | Foster et al. | 370/389 |
| 2002/0186656 A1 | 12/2002 | Vu | |
| 2002/0194412 A1 | 12/2002 | Bottom | |
| 2003/0007493 A1 | 1/2003 | Oi et al. | |
| 2003/0033547 A1 | 2/2003 | Larson et al. | |
| 2003/0041266 A1 | 2/2003 | Ke et al. | |
| 2003/0076832 A1 | 4/2003 | Ni | |
| 2003/0093255 A1 | 5/2003 | Freyensee et al. | |
| 2003/0093624 A1 | 5/2003 | Arimilli et al. | |
| 2003/0110262 A1 | 6/2003 | Hasan et al. | |
| 2003/0140190 A1 | 7/2003 | Mahony et al. | |
| 2003/0158940 A1 | 8/2003 | Leigh | |
| 2003/0159083 A1 | 8/2003 | Fukuhara et al. | |
| 2003/0172191 A1 | 9/2003 | Williams | |
| 2003/0202520 A1 | 10/2003 | Witkowski et al. | |
| 2003/0231624 A1 | 12/2003 | Alappat et al. | |
| 2004/0030938 A1 | 2/2004 | Barr et al. | |
| 2004/0068676 A1 | 4/2004 | Larson et al. | |
| 2004/0111612 A1 | 6/2004 | Choi et al. | |
| 2004/0141521 A1 | 7/2004 | George | |
| 2004/0165588 A1 | 8/2004 | Pandya | |
| 2004/0210693 A1 | 10/2004 | Zeitler et al. | |
| 2004/0215864 A1 | 10/2004 | Arimilli et al. | |
| 2004/0215991 A1 | 10/2004 | McAfee et al. | |
| 2004/0267486 A1 | 12/2004 | Percer et al. | |
| 2005/0015378 A1 | 1/2005 | Gammel et al. | |
| 2005/0018604 A1 | 1/2005 | Dropps et al. | |
| 2005/0018606 A1 | 1/2005 | Dropps et al. | |
| 2005/0018663 A1 | 1/2005 | Dropps et al. | |
| 2005/0021606 A1 | 1/2005 | Davies et al. | |
| 2005/0030954 A1 | 2/2005 | Dropps et al. | |
| 2005/0033742 A1 | 2/2005 | Kamvar et al. | |
| 2005/0033890 A1 | 2/2005 | Lee | |
| 2005/0044195 A1 | 2/2005 | Westfall | |
| 2005/0077921 A1 | 4/2005 | Percer et al. | |
| 2005/0105538 A1 | 5/2005 | Perera et al. | |
| 2005/0240688 A1 | 10/2005 | Moerman et al. | |
| 2006/0013218 A1 | 1/2006 | Shore et al. | |
| 2006/0029053 A1 | 2/2006 | Roberts et al. | |
| 2006/0090025 A1 | 4/2006 | Tufford et al. | |
| 2006/0136570 A1 | 6/2006 | Pandya | |
| 2006/0140211 A1 | 6/2006 | Huang et al. | |
| 2006/0174342 A1 | 8/2006 | Zaheer et al. | |
| 2006/0248359 A1 | 11/2006 | Fung | |
| 2006/0259734 A1 | 11/2006 | Sheu et al. | |
| 2006/0265609 A1 | 11/2006 | Fung | |
| 2007/0006001 A1 | 1/2007 | Isobe et al. | |
| 2007/0076653 A1 | 4/2007 | Park et al. | |

(56) References Cited

U.S. PATENT DOCUMENTS

| | | |
|---|---|---|
| 2007/0094486 A1 | 4/2007 | Moore et al. |
| 2007/0109968 A1 | 5/2007 | Hussain et al. |
| 2007/0130397 A1 | 6/2007 | Tsu |
| 2007/0180310 A1 | 8/2007 | Johnson et al. |
| 2007/0226795 A1 | 9/2007 | Conti et al. |
| 2007/0280230 A1 | 12/2007 | Park |
| 2007/0286009 A1 | 12/2007 | Norman |
| 2007/0288585 A1 | 12/2007 | Sekiguchi et al. |
| 2008/0013453 A1 | 1/2008 | Chiang et al. |
| 2008/0040463 A1 | 2/2008 | Brown et al. |
| 2008/0052437 A1 | 2/2008 | Loffink et al. |
| 2008/0059782 A1 | 3/2008 | Kruse et al. |
| 2008/0075089 A1 | 3/2008 | Evans et al. |
| 2008/0089358 A1 | 4/2008 | Basso et al. |
| 2008/0104264 A1 | 5/2008 | Duerk et al. |
| 2008/0140771 A1 | 6/2008 | Vass et al. |
| 2008/0140930 A1 | 6/2008 | Hotchkiss |
| 2008/0159745 A1 | 7/2008 | Segal |
| 2008/0162691 A1 | 7/2008 | Zhang et al. |
| 2008/0183882 A1 | 7/2008 | Flynn et al. |
| 2008/0186965 A1 | 8/2008 | Zheng |
| 2008/0199133 A1 | 8/2008 | Takizawa et al. |
| 2008/0212273 A1 | 9/2008 | Bechtolsheim |
| 2008/0212276 A1 | 9/2008 | Bottom et al. |
| 2008/0217021 A1 | 9/2008 | Lembcke et al. |
| 2008/0222434 A1 | 9/2008 | Shimizu et al. |
| 2008/0235443 A1 | 9/2008 | Chow et al. |
| 2008/0243634 A1 | 10/2008 | Dworkin et al. |
| 2008/0250181 A1 | 10/2008 | Li et al. |
| 2008/0259555 A1 | 10/2008 | Bechtolsheim et al. |
| 2008/0259788 A1 | 10/2008 | Wang et al. |
| 2008/0266793 A1 | 10/2008 | Lee |
| 2008/0288660 A1 | 11/2008 | Balasubramanian et al. |
| 2008/0288664 A1 | 11/2008 | Pettey et al. |
| 2008/0288683 A1 | 11/2008 | Ramey |
| 2008/0301794 A1 | 12/2008 | Lee |
| 2008/0313369 A1 | 12/2008 | Verdoorn et al. |
| 2008/0320161 A1 | 12/2008 | Maruccia et al. |
| 2009/0021907 A1 | 1/2009 | Mann et al. |
| 2009/0044036 A1 | 2/2009 | Merkin |
| 2009/0064287 A1 | 3/2009 | Bagepalli et al. |
| 2009/0080428 A1* | 3/2009 | Witkowski et al. ........... 370/392 |
| 2009/0097200 A1 | 4/2009 | Sharma et al. |
| 2009/0113130 A1 | 4/2009 | He et al. |
| 2009/0133129 A1 | 5/2009 | Jeong et al. |
| 2009/0135751 A1 | 5/2009 | Hodges et al. |
| 2009/0135835 A1 | 5/2009 | Gallatin et al. |
| 2009/0158070 A1 | 6/2009 | Gruendler |
| 2009/0172423 A1 | 7/2009 | Song et al. |
| 2009/0198958 A1 | 8/2009 | Arimilli et al. |
| 2009/0204834 A1 | 8/2009 | Hendin et al. |
| 2009/0204837 A1 | 8/2009 | Raval et al. |
| 2009/0219827 A1 | 9/2009 | Chen et al. |
| 2009/0222884 A1* | 9/2009 | Shaji et al. ........................ 726/1 |
| 2009/0225751 A1 | 9/2009 | Koenck et al. |
| 2009/0235104 A1 | 9/2009 | Fung |
| 2009/0248943 A1 | 10/2009 | Jiang et al. |
| 2009/0259863 A1 | 10/2009 | Williams et al. |
| 2009/0259864 A1 | 10/2009 | Li et al. |
| 2009/0265045 A1 | 10/2009 | Coxe, III |
| 2009/0271656 A1 | 10/2009 | Yokota et al. |
| 2009/0276666 A1 | 11/2009 | Haley et al. |
| 2009/0279518 A1 | 11/2009 | Falk et al. |
| 2009/0282274 A1 | 11/2009 | Langgood et al. |
| 2009/0282419 A1 | 11/2009 | Mejdrich et al. |
| 2010/0005331 A1 | 1/2010 | Somasundaram et al. |
| 2010/0008038 A1 | 1/2010 | Coglitore |
| 2010/0008365 A1 | 1/2010 | Porat |
| 2010/0026408 A1 | 2/2010 | Shau |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1 | 5/2010 | Kunz et al. |
| 2010/0125742 A1 | 5/2010 | Ohtani |
| 2010/0125915 A1 | 5/2010 | Hall et al. |
| 2010/0138481 A1 | 6/2010 | Behrens |
| 2901/0138481 | 6/2010 | Behrens |
| 2010/0165983 A1 | 7/2010 | Aybay et al. |
| 2010/0169479 A1 | 7/2010 | Jeong et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0123014 A1 | 5/2011 | Smith |
| 2011/0138046 A1 | 6/2011 | Bonnier et al. |
| 2011/0191514 A1 | 8/2011 | Wu et al. |
| 2011/0191610 A1 | 8/2011 | Agarwal et al. |
| 2011/0210975 A1 | 9/2011 | Wong et al. |
| 2011/0271159 A1 | 11/2011 | Ahn et al. |
| 2011/0273840 A1 | 11/2011 | Chen |
| 2011/0295991 A1 | 12/2011 | Aida |
| 2011/0296141 A1 | 12/2011 | Daffron |
| 2011/0320690 A1 | 12/2011 | Petersen et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0297042 A1 | 11/2012 | Davis et al. |
| 2013/0010639 A1 | 1/2013 | Armstrong et al. |
| 2013/0094499 A1 | 4/2013 | Davis et al. |
| 2013/0097448 A1 | 4/2013 | Davis et al. |
| 2013/0148667 A1 | 6/2013 | Hama et al. |
| 2013/0163605 A1 | 6/2013 | Chandra et al. |
| 2013/0290650 A1 | 10/2013 | Chang et al. |
| 2015/0039840 A1 | 2/2015 | Chandra et al. |

FOREIGN PATENT DOCUMENTS

| | | |
|---|---|---|
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

PCT/US2010/053227 Written Opinion dated Dec. 16, 2010 (8 pages).

Advanced Switching Technology Tech Brief, published 2005, 2 pages.

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Comparing the I2C BUS to the SMBUS, Maxim Integrated, Dec. 1, 2000, p. 1.

Deering, "IP Multicast Extensions for 4.3BSD UNIX and related Systems," Jun. 1999, 5 pages.

Extended European Search Report for EP 10827330.1, mailed Jun. 5, 2013.

Final Office Action on U.S. Appl. No. 12/889,721, mailed Apr. 17, 2014.

Final Office Action on U.S. Appl. No. 12/794,996, mailed Jun. 19, 2013.

Final Office Action on U.S. Appl. No. 13/624,725, mailed Nov. 13, 2013.

(56) References Cited

OTHER PUBLICATIONS

Final Office Action on U.S. Appl. No. Application 13/624,731, mailed Jul. 25, 2014.
Final Office Action on U.S. Appl. No. 13/705,340, mailed Aug. 2, 2013.
Final Office Action on U.S. Appl. No. 13/705,414, mailed Aug. 9, 2013.
Final Office Action on U.S. Appl. No. 13/624,731, mailed Nov. 12, 2013.
fpga4fun.com,"What is JTAG?", 2 pages, Jan. 31, 2010.
From AT to BTX: Motherboard Form Factor, Webopedia, Apr. 29, 2005, p. 1.
HP Virtual Connect Traffic Flow—Technology brief, Jan. 2012, 22 pages.
International Preliminary Report on Patentability for PCT/US2009/044200, mailed Nov. 17, 2010.
International Preliminary Report on Patentability for PCT/US2012/038986 issued on Nov. 26, 2013.
International Preliminary Report on Patentability for PCT/US2012/061747, mailed Apr. 29, 2014.
International Preliminary Report on Patentability issued on PCT/US12/62608, issued May 6, 2014.
International Search Report and Written Opinion for PCT/US12/38987, mailed Aug. 16, 2012.
International Search Report and Written Opinion for PCT/US12/61747, mailed Mar. 1, 2013.
International Search Report and Written Opinion for PCT/US12/62608, mailed Jan. 18, 2013.
International Search Report and Written Opinion for PCT/US2011/051996, mailed Jan. 19, 2012.
International Search Report and Written Opinion on PCT/US09/44200, mailed Jul. 1, 2009.
International Search Report and Written Opinion on PCT/US2012/038986, mailed Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, mailed Feb. 21, 2014.
Non-Final Office Action on U.S. Appl. No. 12/889,721, mailed Jul. 2, 2013.
Non-Final Office Action on U.S. Appl. No. 13/475,722, mailed Jan. 17, 2014.
Non-Final Office Action on U.S. Appl. No. 12/794,996, mailed Sep. 17, 2012.
Non-Final Office Action on U.S. Appl. No. 12/889,721, mailed Oct. 11, 2012.
Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/527,505, mailed May 8, 2014.
Non-Final Office Action on U.S. Appl. No. 13/527,498, Mailed May 8, 2014.
Non-Final Office Action on U.S. Appl. No. 13/624,725, mailed Jan. 10, 2013.
Non-final office action on U.S. Appl. No. 13/624,731 mailed Jan. 29, 2013.
Non-Final Office Action on U.S. Appl. No. 13/692,741, mailed Sep. 4, 2014.
Non-Final Office Action on U.S. Appl. No. 13/705,286, mailed May 13, 2013.
Non-Final Office Action on U.S. Appl. No. 13/705,340, mailed Mar. 12, 2014.
Non-Final Office Action on U.S. Appl. No. 13/705,340, mailed Mar. 29, 2013.
Non-Final Office Action on U.S. Appl. No. 13/705,414, mailed Apr. 9, 2013.
Non-Final Office Action on U.S. Appl. No. 13/705,428, mailed Jul. 10, 2013.
Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Venaas, "IPv4 Multicast Address Space Registry," 2013, http://www.iana.org/assignments/multicast-addresses/multicast-addresses.xhtml.
Final Office Action on U.S. Appl. No. 13/527,505, mailed Dec. 5, 2014.
Notice of Allowance on U.S. Appl. No. 13/705,340, mailed Dec. 3, 2014.
Final Office Action on U.S. Appl. No. 13/475,722, mailed Oct. 20, 2014.
Final Office Action on U.S. Appl. No. 13/527,498, mailed Nov. 17, 2014.
Non-Final Office Action on U.S. Appl. No. 12/889,721, mailed Sep. 29, 2014.
Non-Final Office Action on U.S. Appl. 13/234,054, mailed Oct. 23, 2014.
Non-Final Office Action on U.S. Appl. No. 13/662,759, mailed Nov. 6, 2014.
Elghany et al., "High Throughput High Performance NoC Switch," NORCHIP 2008, Nov. 2008, pp. 237-240.
Grecu et al., "A Scalable Communication—Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on Chip," 2005 IEEE Pacific Rim Conference on Communications, Computers and Signal Processing, Aug. 2005, pp. 613-616.
Non-Final Office Action on U.S. Appl. No. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Final Office Action on U.S. Appl. No. 13/692,741, mailed Mar. 11, 2015.
Non-Final Office Action on U.S. Appl. No. 14/106,698, mailed Feb. 12, 2015.
Notice of Allowance on U.S. Appl. No. 13/475,722, mailed Feb. 27, 2015.
Notice of Allowance on U.S. Appl. No. 13/527,498, mailed Feb. 23, 2015.
Notice of Allowance on U.S. Appl. No. 13/527,505, mailed Mar. 6, 2015.
Notice of Allowance on U.S. Appl. No. 13/624,731, mailed Mar. 5, 2015.
Reexamination Report on Japanese Application 2012-536877, mailed Jan. 22, 2015 (English Translation not available).
Search Report on EP Application 10827330.1, mailed Feb. 12, 2015.
Final Office Action on U.S. Appl. No. 13/234,054, mailed Apr. 16, 2015.
Non-Final Office Action on U.S. Appl. No. 13/624,725, mailed Apr. 23, 2015.

\* cited by examiner

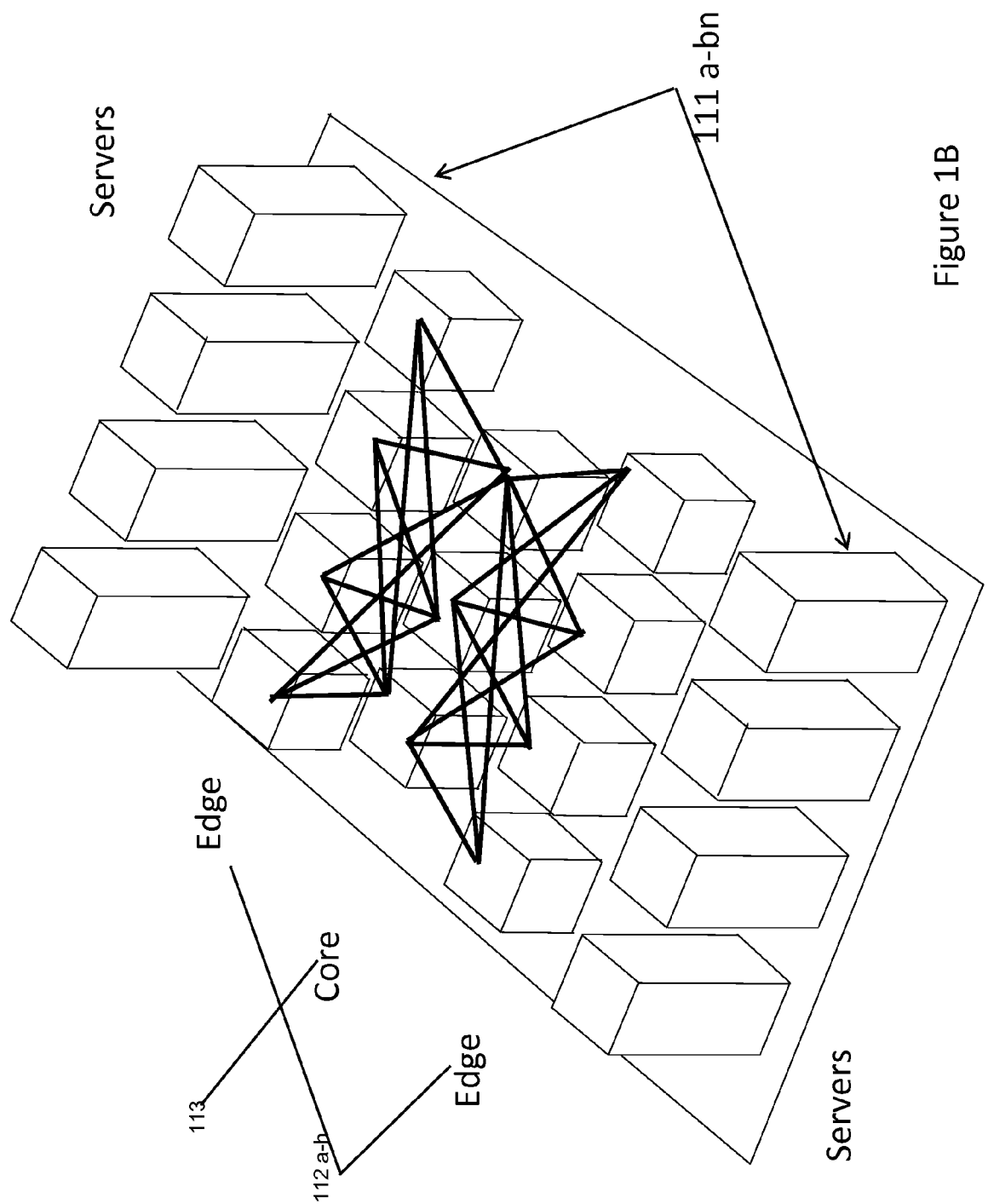

SYSTEM AND METHOD FOR DATA CENTER SECURITY ENHANCEMENTS LEVERAGING SERVER SOCS OR SERVER FABRICS

PRIORITY CLAIM/RELATED APPLICATIONS

This application claims the benefit under 35 USC 119(e) and 120 to U.S. Provisional Patent Application Ser. No. 61/489,569 filed on May 24, 2011 and entitled "Data Center Security Enhancements Leveraging Server SoCs Or Server Fabrics", the entirety of which is incorporated herein by reference. This application is also a continuation in part and claims priority under 35 USC 120 to U.S. patent application Ser. No. 12/794,996, filed on Jun. 7, 2010 that in turn claims the benefit under 35 USC 119(e) and 120 to U.S. Provisional Patent Application Ser. No. 61/256,723 filed on Oct. 30, 2009, all of which are also incorporated herein by reference.

FIELD

The disclosure relates generally to security aspects for data centers and in particular to data center security enhancements leveraging server systems on a chip (SOCs) or server switch fabrics.

BACKGROUND

FIGS. 1A and 1B show a classic data center network aggregation as is currently well known. FIG. 1A shows a diagrammatical view of a typical network data center architecture 100 wherein top level switches 101a-n are at the tops of racks 102a-n filled with blade servers 107a-n interspersed with local routers 103a-f. Additional storage routers and core switches. 105a-b and additional rack units 108a-n contain additional servers 104 e-k and routers 106a-g FIG. 1b shows an exemplary physical view 110 of a system with peripheral servers 111a-bn arranged around edge router systems 112a-h, which are placed around centrally located core switching systems 113. Typically such an aggregation 110 has 1-Gb Ethernet from the rack servers to their top of rack switches, and often 10 Gb Ethernet ports to the edge and core routers. These typical data centers do not have good security.

The idea of network security is well known. The terms used in field of network security may include deep packet inspection (DPI) and intrusion prevention systems (IPS) which are also known as Intrusion Detection and Prevention Systems (IDPS) and are network security appliances that monitor network and/or system activities for malicious activity. The main functions of intrusion prevention systems are to identify malicious activity, log information about said activity, attempt to block/stop activity, and report activity. The network security may also utilize an intrusion detection system (IDS), which is a device or software application that monitors network and/or system activities for malicious activities or policy violations and produces reports to a Management Station.

FIG. 2 shows a typical implementation of an IDS and IPS within a corporate network. In the typical implementation, the IDS is focused on detection, monitoring, and reporting of potential intrusions. As such, the IDS is implemented out-of-line of the core network flow and is not invasive (located outside of the firewall and attached to a DMZ switch as shown in FIG. 2). The IPS adds the capability to prevent and block potential intrusion or undesired network flows and the IPS is implemented in-line of the core network flow.

Thus, it is desirable to provide a data center security system and method that leverage server systems on a chip (SOCs) and/or server fabrics, and it is to this end that the disclosure is directed.

BRIEF DESCRIPTION OF THE DRAWINGS

FIGS. 1A and 1B illustrate a typical data center system.

DETAILED DESCRIPTION OF ONE OR MORE EMBODIMENTS

The disclosure is particularly applicable to a Calxeda™ server system on a chip and Calxeda™ switch fabrics as illustrated and described below with the security aspects and it is in this context that the disclosure will be described. However, the principles described below can be applied to other server-on-a-chip systems.

A server-on-a-chip (SOC) with packet switch functionality is focused on network aggregation. It contains a layer 2 packet switch, with routing based on source/destination MAC addresses. It further supports virtual local area network (VLAN), with configurable VLAN filtering on domain incoming packets to minimize unnecessary traffic in a domain. The embedded MACs within the SOC do have complete VLAN support providing VLAN capability to the overall SOC without the embedded switch explicitly having VLAN support.

Figure 1A:
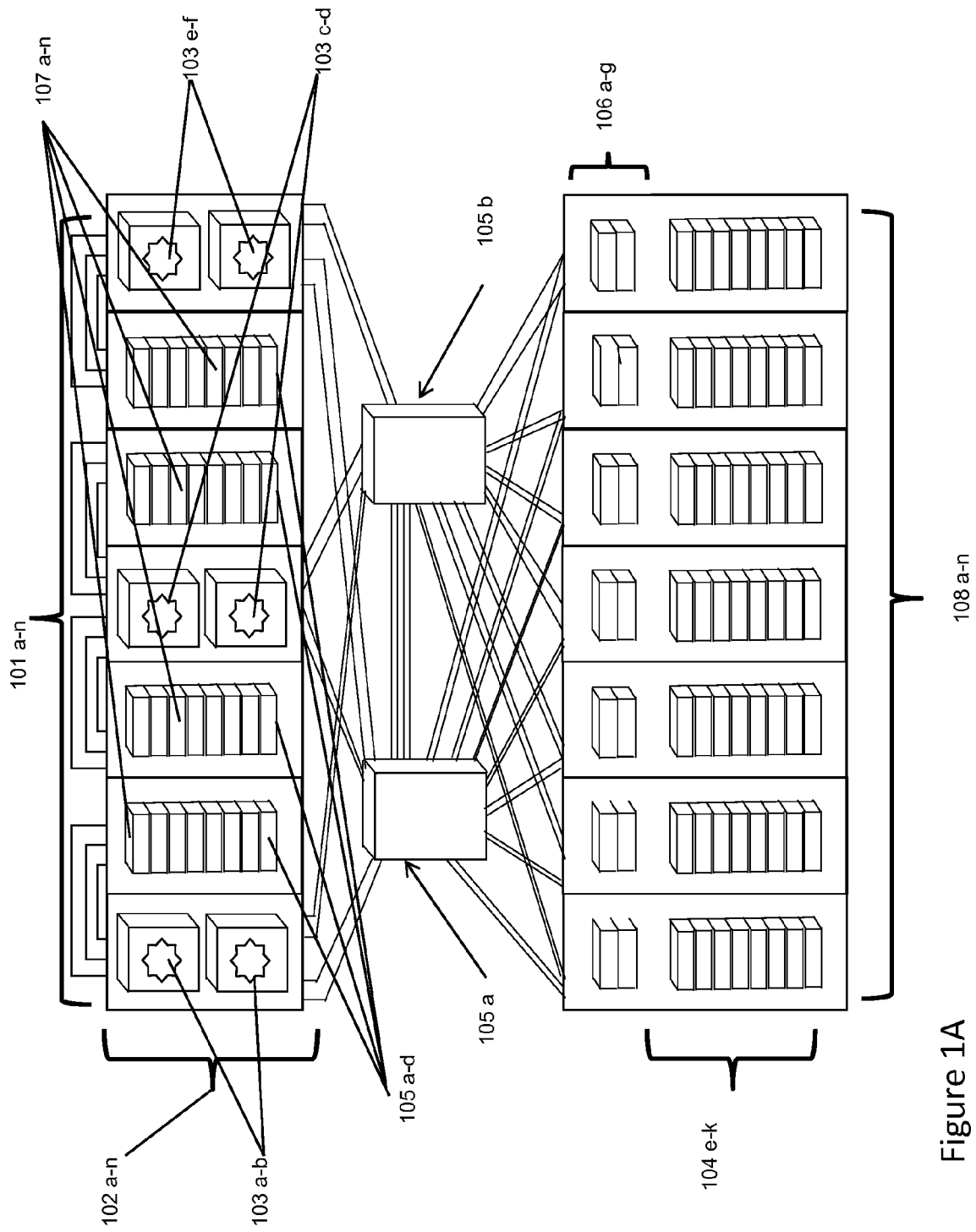
Figure 2:
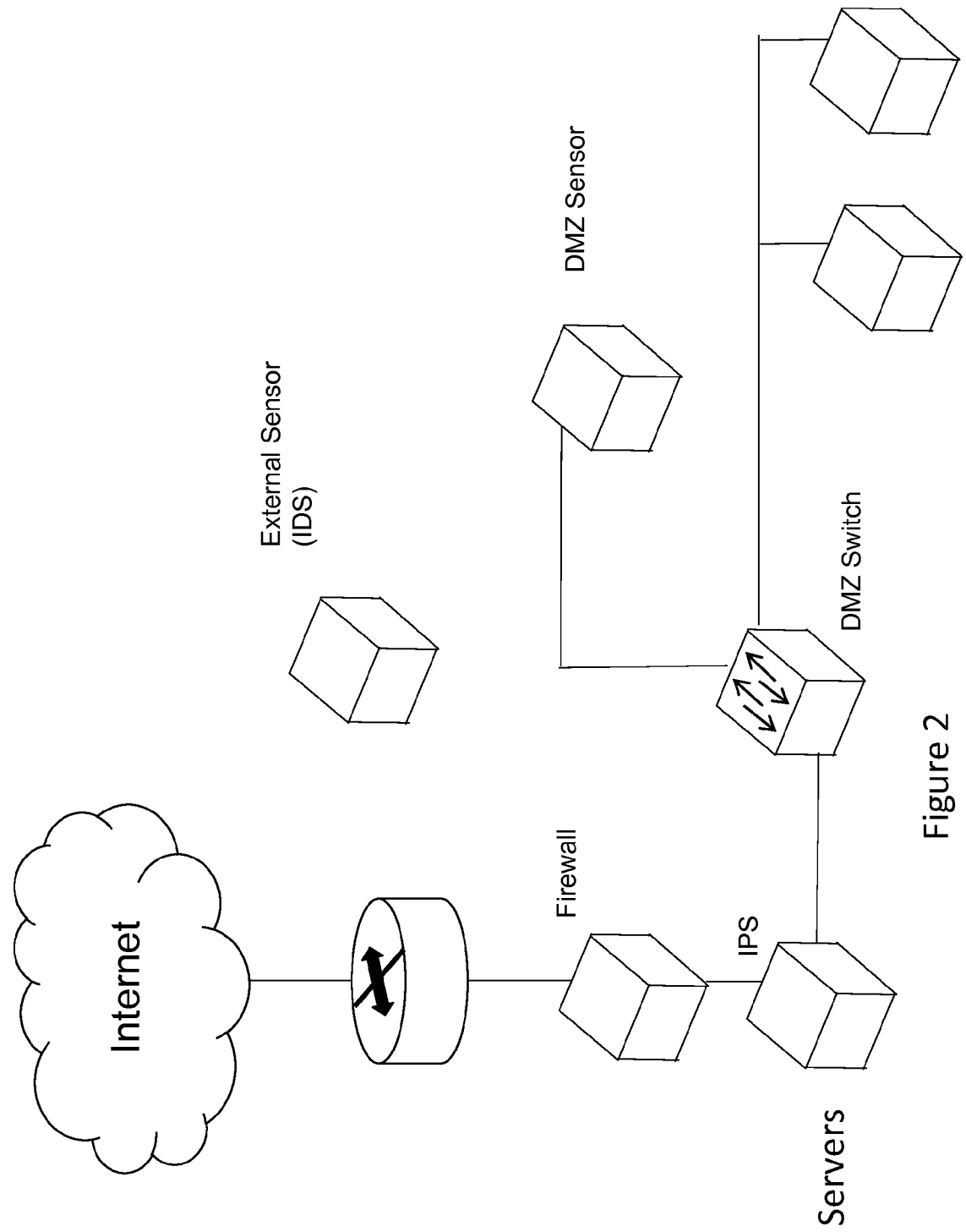
FIG. 2 shows a typical implementation of an IDS and IPS within a corporate network.
Figure 3:
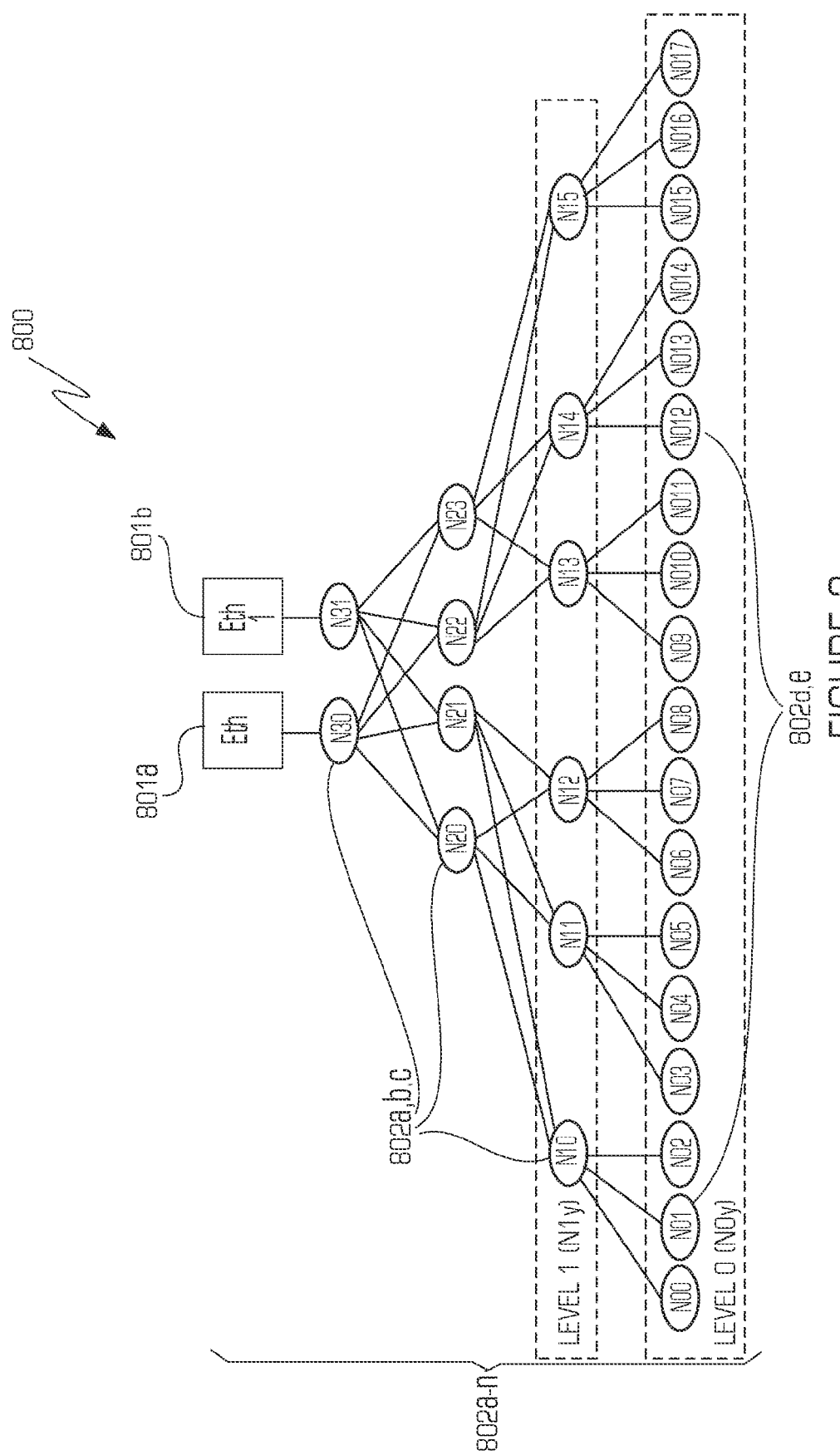
FIG. 3 illustrates a high-level topology of a network aggregating system that may be leveraged for increased security in a data center.

FIG. 3 shows a high-level topology 800 of the network system that illustrates XAUI (a well known interface standard) connected SoC nodes connected by the switching fabric. Two 10 Gb Ethernet ports Eth0 801a and Eth1 801b come from the top of the tree. Ovals 802a-n are Calxeda™ nodes that comprise at least one computational processors and an embedded switch. Each node may have five XAUI links connected to the internal switch. The switching layers use all five XAUI links for switching. Level 0 leaf nodes 802d, e (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat trees have active nodes only as leaf nodes, and the other nodes are pure switching nodes. This approach makes routing much more straightforward. Topology 800 has the flexibility to permit every node to be a combination computational and switch node, or just a switch node. Most tree-type implementations have I/O on the leaf nodes, but topology 800 let the I/O be on any node. In general, placing the Ethernet at the top of the tree (the Ethernet ports) minimizes the average number of hops to the Ethernet.

The system and method also supports a routing using a tree-like or graph topology that supports multiple links per node, where each link is designated as an Up, Down, or Lateral link, or both, within the topology. In addition, each node in the system may be a combination computational/switch node, or just a switch node, and input/outpout (I/O) can reside on any node as described below in more detail. The system may also provide a system with a segmented Ethernet Media Access Control (MAC) architecture which may have a method of re-purposing MAC IP addresses for inside MACs and outside MACs, and leveraging what would normally be the physical signaling for the MAC to feed into the switch. The system may also provide a method of non-spoofing communication, as well as a method of fault-resilient broadcasting, which may have a method of unicast misrouting for fault resilience.

A data center with the Calxeda™ server system on a chip may be implemented using the set of fabric connected nodes with Ethernet uplinks as shown in FIG. 3. Each node may be one or more Calxeda server boxes each of which has at least one Calxeda™ server system on a chip.

The system may also provide a rigorous security between the management processor cores, such that management processors can "trust" one another. In the example node 900 shown in FIG. 4 (which is described below in more detail), there is a management processor core within each SoC (block 906, FIG. 4). The software running on the management processor is trusted because a) the vendor (in this case Calxeda™) has developed and verified the code, b) non-vendor code is not allowed to run on the processor. Maintaining a Trust relationship between the management processors allow them to communicate commands (e.g. reboot another node) or request sensitive information from another node without worrying that a user could spoof the request and gain access to information or control of the system.

Typically the management processor, block 906, is running an embedded OS, while the multiple processor cores represented by block 905 are more typically running a standard operating system, such as Linux. The management processor would typically use one of the Ethernet MACs, in this case block 907, while the main processors, block 905, would utilize the remaining Ethernet MACs, in this case blocks 902 and 903.

Each routing header unit 901, that may be implemented as a processing unit or processor, prepends routing headers to layer 2 Ethernet frames to form a routing frame going into the fabric switch, and removes the routing headers as they leave the switch and enter standard Ethernet MACs. The routing frame is composed of the routing frame header plus the core part of the Ethernet frame, and is structured as shown in Table 1, below:

TABLE 1

| Routing Header Prepended to Layer 2 Frame | | | | | |
|---|---|---|---|---|---|
| Routing Frame Header | Ethernet Frame Packet | | | | |
| RF Header | MAC destination | MAC Source | Ethertype/ Length | Payload (data and padding) | CRC32 |

The routing frame header (RF Header) typically consists of the fields shown in Table 2, below:

TABLE 2

| Routing Header Fields | | |
|---|---|---|
| Field | Width (Bits) | Notes |
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC_OUT |
| Dest Node | 12 | Destination node ID |
| Dest Port | 2 | 0 = MAC0, 1 = MAC1, 2 = MAC_management processor, 3 = MAC_OUT |
| RF Type | 2 | Routing Frame Type (0 = Unicast, 1 = Multicast, 2 = Neighbor Multicast, 3 = Link Directed) |
| TTL | 6 | Time to Live—# of hops that this frame has existed. Switch will drop packet if the TTL threshold is exceeded (and notify management processor of exception). |
| Broadcast ID | 5 | Broadcast ID for this source node for this broadcast packet. |
| Checksum | | Checksum of the frame header fields. |
| Total | 46 | +checksum |

The Routing Header processor 901 contains a MAC Lookup CAM (Content Addressable Memory) (MCAM), macAddrLookup, that maps from 6 byte MAC addresses to 12-bit Node IDs, as shown in Table 3, below.

TABLE 3

| MAC Address CAM (MCAM) | | | |
|---|---|---|---|
| MAC Lookup CAM Input | | MAC Lookup CAM Output | |
| Node Local | MAC Address | Node ID | Port ID |
| 1 bit | 6 bytes | 12 bits | 2 bits |

The approach to security domain management in the system and method disclosed here is as follows: Support multiple domain IDs within the fabric. Allow each of the MACs within a node (management processor, MAC0, MAC1, Gateway) to be assigned to a domain ID individually (and tagged with domain 0 if not set). Allow each of the MACs within a node to have a bit indicating access to the management domain. The domain IDs associated with a MAC could only be assigned by the management processor, and could not be altered by the A9. For frames generated by MACs (both inside and outside), the routing frame processor would tag the routing frame with the domain ID and management domain state associated with that MAC. Domains would provide the effect of tunnels or VLANs, in that they keep packets (both unicast and multicast) within that domain, allowing MACs outside that domain to be able to neither sniff or spoof those packets. Additionally, this approach would employ a five-bit domain ID. It would add options to control domain processing, such as, for example, a switch with a boolean per MAC that defines whether packets are delivered with non-defined (i.e., zero) domain ID, or a switch that has a boolean per MAC that defines whether packets are delivered with defined (non-zero) but non-matching domain IDs. A further option in the switch could turn off node encoded MAC addresses per MAC (eliminating another style of potential attack vector). Each of these options described in this paragraph are options that are implemented in the fabric switch, controlled by bits in the control status registers (CSRs) of the fabric switch. Software initializes the CSRs to the desired set of options.

To keep management processor to management processor communication secure, the management domain bit on all management processor MACs could be marked. Generally, the management processor should route on domain 1 (by convention). Such a technique allows all the management processor's to tunnel packets on the management domain so that they cannot be inspected or spoofed by any other devices (inside or outside the fabric), on other VLANs or domains. Further, to provide a secure management LAN, a gateway MAC that has the management domain bit set could be assigned, keeping management packets private to the management processor domain. Additionally, the switch fabric could support "multi-tenant" within itself, by associating each gateway MAC with a separate domain. For example, each gateway MAC could connect to an individual port on an outside router, allowing that port to be optionally associated with a VLAN. As the packets come into the gateway, they are tagged with the domain ID, keeping that traffic private to the MACs associated with that domain across the fabric.

Unicast routing is responsible for routing non-multicast (i.e. unicast) packets to the next node. This is done by utilizing a software computed unicastRoute[ ] next node routing table that provides a vector of available links to get to the destination node.

Server Interconnect Fabric Security

The above server fabric and switch fabric can benefit by enhanced security and a number of techniques to leverage and extend upon server interconnect fabrics that have some or all of the characteristics described above to dramatically improve security within a data center are described. The different embodiments implement "packet processing" which may include a wide range of packet processing including, but not limited to: IDS functionality, IPS functionality, sFlow monitoring (wherein sFlow is a specification for monitoring computer networks set forth in an sFlow specification that is RFC 3176) Packet routing or bridging between networks, Deep packet inspection, Packet logging, Transparent VPN encapsulation, Packet encryption/decryption and/or Packet compression/decompression.

Multi-Tenant Fabric Use Case

In a first embodiment, the server fabric domains are used to enhance security in fabric multi-tenant use case. In particular, there are data centers that host applications and data for multiple clients and networked servers within a single rack may host multiple clients. In the case of servers and nodes connected via interconnect fabrics, one example of which is described above, multiple clients may exist on separate nodes (such as the nodes shown in FIGS. 3 and 4 above) within a single fabric which is a multi-tenant fabric use case.

There are a couple of network security goals in this multi-tenant fabric use case:
Client A should have no possible way to inspect data from Client B, including Client B's network traffic.
Client A should have no possible way to spoof data to Client B's network. This case specifically covers the case where network packets cannot be hand crafted to look like they came from a Client B node, and routed to a Client B node.

Figure 5:
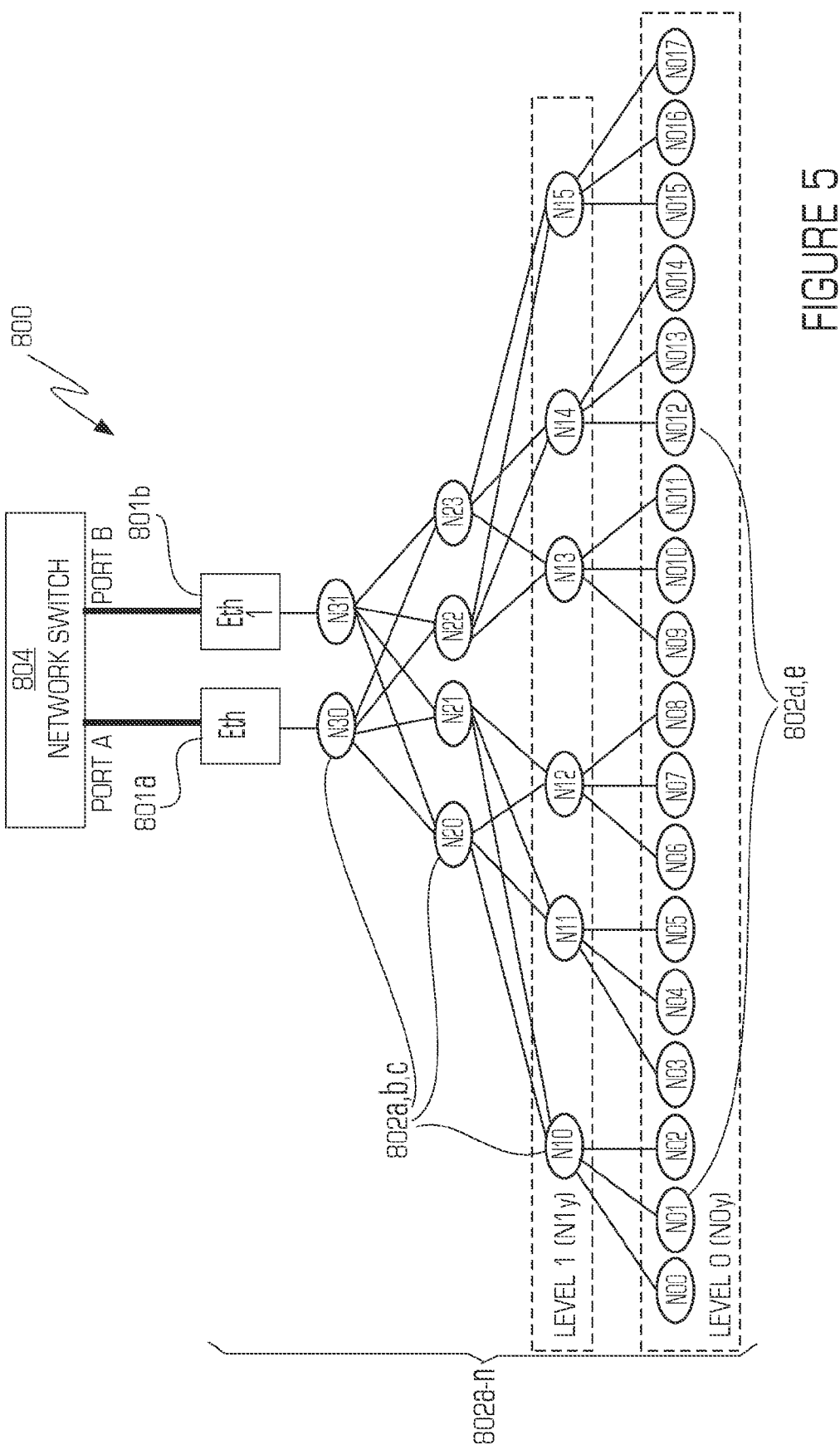
FIG. 5 illustrates a network aggregation system with a network switch and enhanced security.

To illustrate this embodiment, FIG. 5 illustrates a network aggregation system with a network switch and enhanced security. As shown in FIG. 5, a number of server nodes, 802*a-n*, are connected by a server interconnect fabric, there are two gateway nodes, N30 and N31, that serve as Ethernet gateways to the outside Ethernet network and there are two gateway Ethernet ports, 801*a* and 801*b* that are connected to a network switch 804, typically a top of rack switch, connecting to two ports on the switch, Port A and Port B.

When Client A's network traffic comes from Port A on the switch and Client B's network traffic comes from Port B on the switch, a common way for a network engineer to manage this multi client use would be to have a VLAN assigned to Client A and a different VLAN assigned to Client B. To guarantee isolation of Client A's traffic from Client B's traffic on the fabric, the following techniques (alone or in combination) can be used:
Map Client A's VLAN to Port A and Map Client B's VLAN to Port B.
Assign Fabric Domain A to Gateway Eth0 801*a* and assign Fabric Domain B to Gateway Eth1 801*b*.
Initialize every node in the fabric such that the node's MACs will only accept packets from that particular client's fabric domain. As an example, all the nodes in the cluster assigned to Client A will have the MAC fabric ports within that node to be assigned to only accept Domain A packets, and drop other domain packets.

Using this technique, there will be no packet visibility between the clients, and no packets (unicast or multicast) can be transferred directly between them on the fabric, which improves the security of the system by leveraging the server fabric.

Securing Inter-Management Processor Traffic within the Fabric

Figure 4:
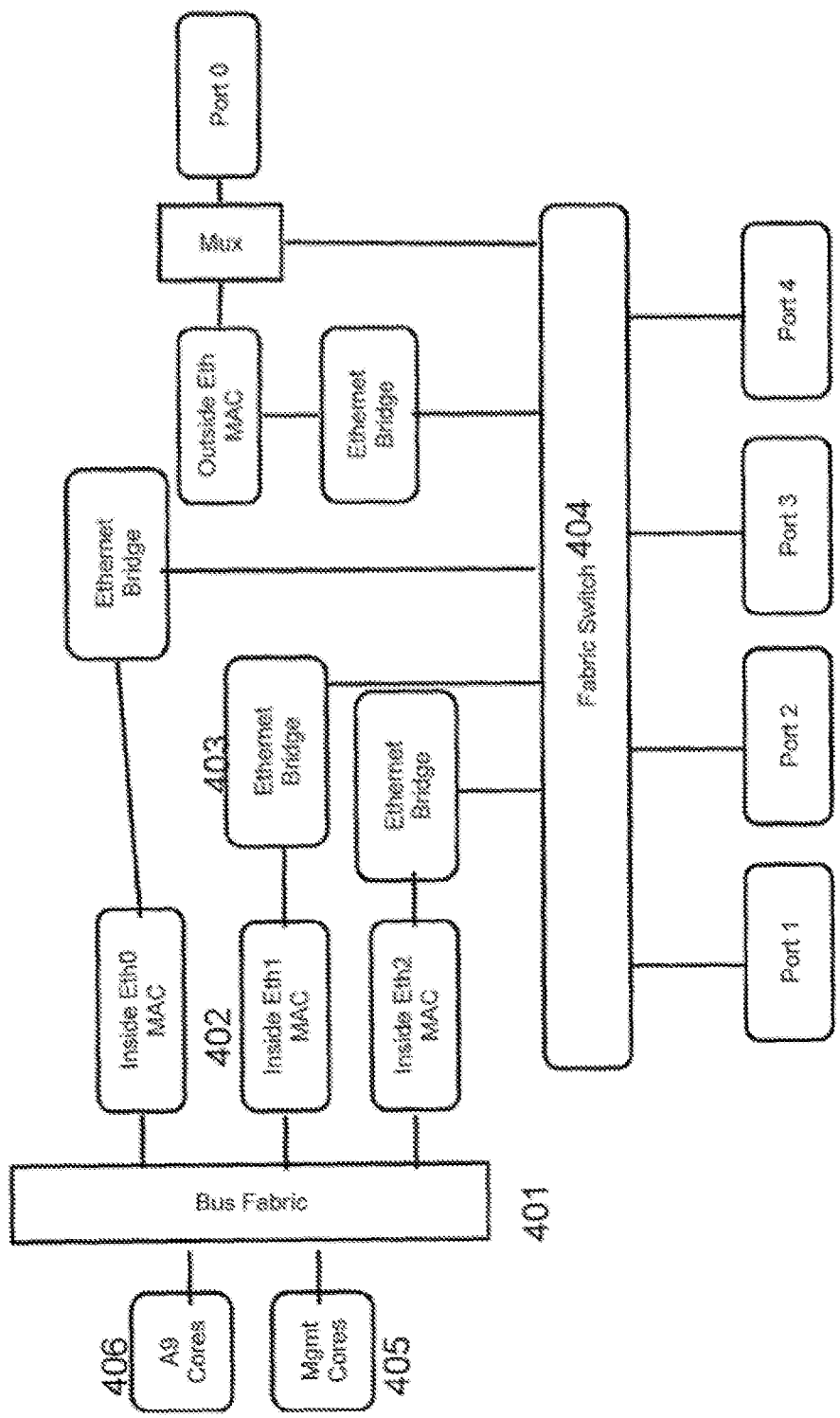
FIG. 4 illustrates a block diagram of an exemplary switch of the network aggregation system that may be leveraged for increased security in a data center.

In a Second Embodiment, the Inter-Management Processor (906 in FIG. 4) Traffic with the fabric is secured. In particular, the management processors within a server fabric (at each node as shown in FIG. 4) need a secure way to communicate between themselves with no possibility of sniffing or spoofing by the application processors within the fabric. The following techniques (alone or in combination) can be used to secure inter-management traffic:
Either set the management domain bit within the Routing Header (see above) Processor for the management processor and/or assign that MAC the Fabric Domain of 0.
Configure the fabric such that the Ethernet MAC for the management processor only accepts routing headers marked with the management domain bit, or having Fabric Domain of 0.
Configure the fabric such that the Ethernet MACs for the application processors do not have the management domain bit set, and have a non-zero Fabric Domain.

Creating Secure Private Management LAN

In a third embodiment, the fabric may be used to create a secure private management local area network (LAN.) Traditional rack-oriented servers may have an embedded BMC (baseboard management controller) and the BMC will have two paths for network connectivity including a shared management LAN with BMC traffic being routed out the main network port of the server and a Private management LAN with BMC traffic being routed out a private network port of the server.

Figure 6:
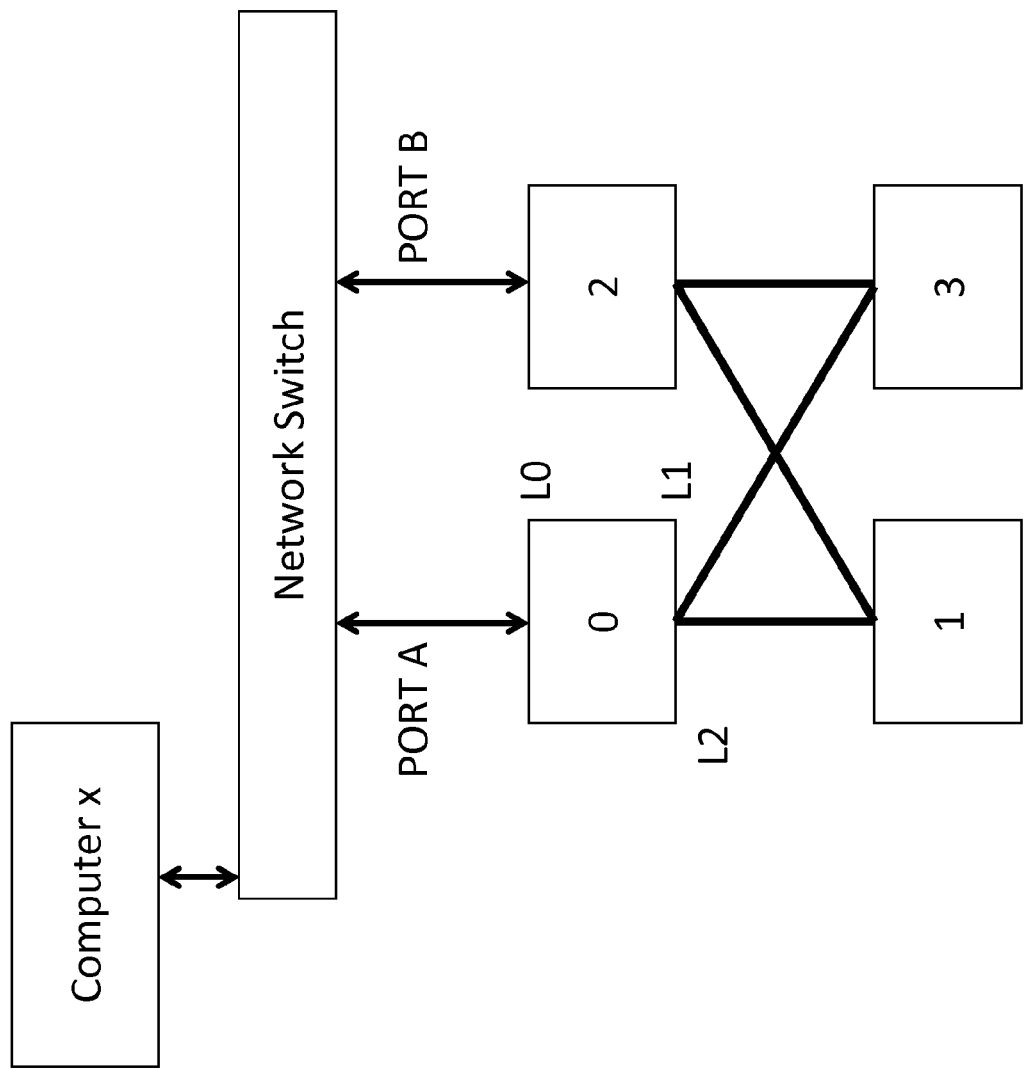
FIG. 6 illustrates a four-node server fabric with a network switch and enhanced security.

To illustrate this embodiment, FIG. 6 illustrates a four-node server fabric with a network switch and enhanced security with the goal of creating a private management LAN for the server fabric. The following technique (alone or in combination) can be used to secure the management traffic out of Eth1 801*b*:
Set the management domain bit within the Routing Header Processor for the management processor and assign that MAC the Fabric Domain of 0.

Configure the fabric such that the Ethernet MAC for the management processor only accepts routing headers marked with the management domain bit, or having Fabric Domain of 0.

Configure the fabric such that the Routing Header Processor for the outgoing MAC, block 910D of FIG. 4, of N31, Eth1 is configured to tag and only accept Fabric Domain of 0.

Configure the fabric such that the Ethernet MACs for the application processors do not have the management domain bit set, and have a non-zero Fabric Domain In this way, the management processor's can securely communicate using the Management Domain, and management traffic will be secured on Eth1.

Using Constrained Routing Tables to Enhance Security in Multi-Tenant Fabrics

Figure 7:
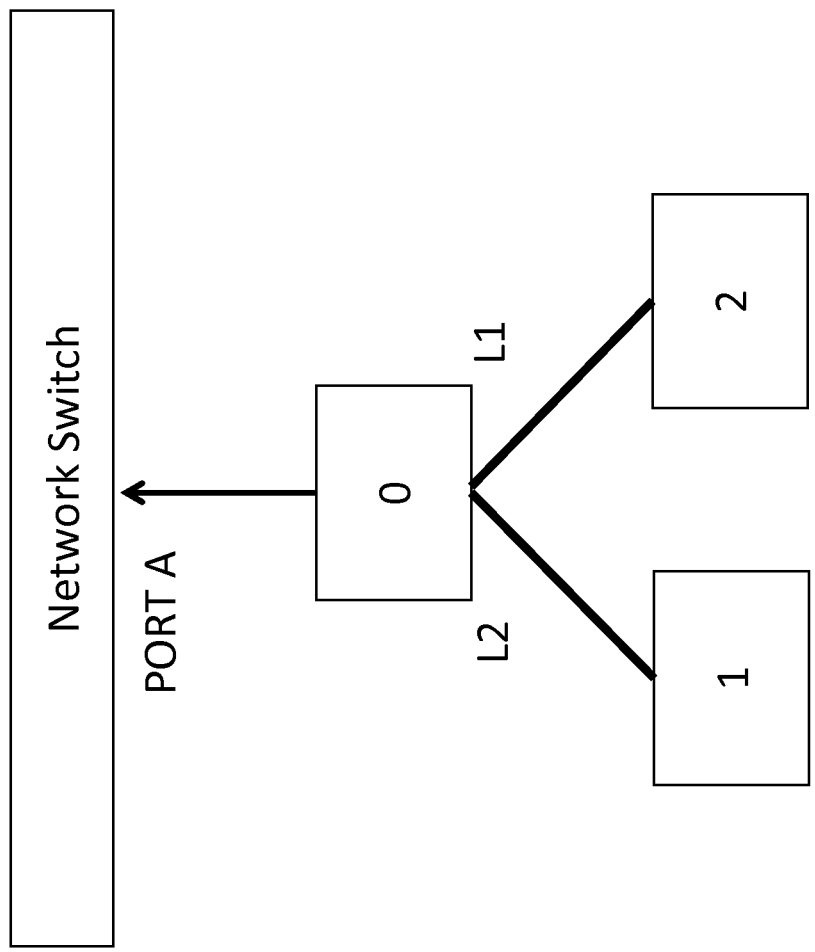
FIG. 7 illustrates a small three-node server fabric with a network switch and enhanced security.

In a fourth embodiment, constrained routing tables are used to enhance security in multi-tenant fabric. To illustrate this embodiment, FIG. 6 illustrates a four-node server fabric (nodes 0, 1, 2 and 3 in FIG. 6) with a network switch and enhanced security. The link numbers are depicted in the figure, as an example, packets leaving Node 0 to Node 1 would leave on link 2 (L2 as shown in FIG. 7). A typical unicast routing table for this fabric for Node 1 would look like the following:

TABLE 4

Node 0 Full Fabric Routing Table

| Destination Node | Outgoing Link |
|---|---|
| 0 | — |
| 1 | L2 |
| 2 | L0 |
| 3 | L1 |

In the case in a multi-tenant fabric where Nodes 0 and 1 are being used by Customer A and Nodes 2 and 3 are being used by Customer B, routing can actually be denied from one customer to another by not having the routes such as in the below constrained routing table.

TABLE 5

Node 0 Constrained Routing Table

| Destination Node | Outgoing Link |
|---|---|
| 0 | — |
| 1 | L2 |
| 2 | — |
| 3 | — |

Packet Processing Using OS Routing on Gateway Node

In a fifth embodiment, the fabric can perform packet processing using operating system (OS) routing on a gateway node. This embodiment is illustrated in FIG. 7 that shows a small three-node server fabric. The following technique can be used to create an IPS using the gateway node, node 0:

Assign the incoming Ethernet gateway traffic to the Eth0 MAC (block 902 of FIG. 4) and it can be designated as the Outside MAC.

Assign the fabric-side Ethernet traffic to the Eth1 MAC (block 903 of FIG. 4) and it can be designates as the Inside MAC.

Use Linux (or other OS equivalent) routing features to route traffic between the Inside MAC and the Outside MAC.

Linux (or other OS equivalent) IPS (e.g. Snort) or IDS software can then be run on the application processors (block 905 of FIG. 4) to inspect or block traffic between the fabric and the outside Ethernet.

Packet Processing on Arbitrary Nodes Using Non-Symmetric MCAMs

The sixth embodiment is directed to packet processing on arbitrary nodes using non-symmetric MCAMs. This embodiment is illustrated in FIG. 7 that shows the small three-node server fabric. The following technique can be used to create an IPS using an arbitrary node as the IPS (in this example node 2):

Initialize the MCAM on Node 0, the gateway node, such that all fabric MAC addresses map to Node 2

TABLE 6

Asymmetric MCAM for Node 0 for Node 2 IPS/IDS

| MAC Address | Node |
|---|---|
| Node 0 MAC | 2 |
| Node 1 MAC | 2 |
| Node 2 MAC | 2 |

Initialize the MCAM on Node 2 to map the MAC addresses to the correct nodes.

TABLE 7

Asymmetric MCAM for Node 2 for Node 2 IPS/IDS

| MAC Address | Node |
|---|---|
| Node 0 MAC | 0 |
| Node 1 MAC | 1 |
| Node 2 MAC | 2 |

Packets coming into the gateway node hit the fabric switch on node 0.

The destination MAC address on the packet gets translated by the Node 0 MCAM to a destination node, in this case Node 2 (for all fabric MAC addresses).

Packet gets routed to Node 2 and delivered to the application processor MAC on Node 2.

IPS/IDS software runs on node 2, then assuming the packet is not blocked forwards the packet back into the fabric for delivery.

The destination MAC address on the packet gets translated by the Node 2 MCAM to a destination node, in this case the correct destination node within the fabric, and gets delivered to the targeted destination node.

Packet Processing Using Local Management Processor

The seventh embodiment relates to packet processing using local management processor(s), which can be illustrated by the small three-node server fabric depicted in FIG. 7. The following technique can be used to create an IDS or other packet inspection and logging using the local management processor on each node:

Configure the fabric Promiscuous Vector to replicate packets to the management processor MAC (block 906 of FIG. 4). The Promiscuous Vector defines a list of ports to which the incoming packet should be replicated. This allows the management processor to declare to the switch that it should get a copy of the incoming packets, without knowledge or intervention of the source or destination of the packet transfer.

Packets entering or leaving Eth0 and Eth1 MACs (blocks 902 and 903 of FIG. 4) will be replicated to management processor MAC, block 906.

The management processor can then run IDS or other packet inspection or logging software not only unobtrusively to the OS and applications on the application processor, but without the OS or applications processor being aware of the management processor packet processing.

Security Enhancement of Having Non-Whitelisted Destination Macs Dropped at the Ingress Node The eighth embodiment is directed to a security enhancement of having Non-whitelisted destination MACs dropped at the ingress node which can be illustrated using the switch fabric in FIG. 7 to be able to enforce white-listing of destination MAC addresses (meaning that the network manager will have a list of known MAC addresses within the fabric or within the broadcast domain, and packets ingressing into the fabric that are not on the destination MAC whitelist will be immediately dropped.) The following technique can be used to create MAC address whitelists:

The Network administrator collects all the MAC addresses within the broadcast domain, both inside and outside the fabric.

All the MCAMs are initialized with the complete list of (MAC Address, Node ID, Port ID) mappings.

For those MAC addresses that are outside the fabric, the MCAM mapping is to (Gateway Node ID, Outlink Port).

The primary and secondary gateway node ID mappings in each switch are disabled.

This results in packets entering the fabric that don't match the MAC address whitelist to be routed to the gateway node, but by invalidating the gateway node entries, the packets are dropped.

This results in packets being dropped immediately at the ingress point that don't match the MAC address whitelist.

Additional Security Aspects

The security may also include secure fabric local Network Attached Storage (NAS) through private internal domains. There are domains do not have to go all the way to an uplink. Thus, the system can establish a domain between one server node and a node acting as a NAS server.

The system may also provide port scan and port sweep monitoring. A port sweep is the act of systematically scanning the ports on one or more computers by security attackers to find weakened access points to break into computer systems. A port scan is a series of messages sent by someone attempting to break into a computer to learn which computer network services, each associated with a port number, the computer provides. The port scan and port sweep are generally hard to detect at the IPS/IPD level because that are a large number of data flows to watch (and with port sweep many systems) and tracking of the accesses over time. Since the switch system described above has all traffic going into the cluster, the system can monitor for port scan/port sweep better than external appliances.

The system also may allow for the monitoring for a typical network traffic to/from a node. Since the system can monitor all rates over time, the system can monitor traffic to/from a node and isolate it, or flag it, if it exceeds (customer settable) tolerances.

The system may also provide isolation of traffic. In particular, in addition to operating system (OS) routing to separate multi-tenant traffic, the system can also provide physical isolation by cutting links.

The system may also permit customers to configure the topology of the switch. The configuration of the switch may prevent the sharing of links (avoiding a DOS at a link), or sharing of boards (to avoid fault sharing.)

The system may also use IP reputation processing for security. In particular, the blocking or allowing of access based on source address may be incorporated into any place in the switch that packet processing occurs. Using IP reputation processing, the system can support multiple equivalent servers with one server receiving traffic from trusted systems, one receiving traffic from less trusted systems, and one receiving from untrusted system. This could allow for faster/streamlined processing of trusted traffic, and more security checking of less trusted traffic.

The switch security (and the management processor in particular) may provide encryption services in which the keys never leave the trusted zone.

The switch system may also perform real mapping of external virtual local area networks (VLANs) to domains by having the uplink nodes being in their own domains. To provide the real mapping, the switch uses their downlinks as MACLinks (even though they go to our nodes) and uses routing through the downlinks to pick the desired domain (based on VLAN). For example, if the user wants to map a VLAN101 packet to Domain10, the uplink node would have the four other links configured as MACLinks, one of those links would go to another node (whose link is also configured as a MACLink with a Domain of 10, so any packet sent down that link goes into the fabric as Domain10.)

The use of the Outside Ethernet MAC (904 in FIG. 4) gives the system the ability to filter on VLANs, Source MAC, Destination MAC, etc. with perfect filters and wildcards or hashes within the Outlink. Thus, packets can be dropped before they enter the fabric and that is another way of implementing security enhancement of having Non-Whitelisted Destination MACs dropped at the Ingress Node or dropping of packets based on a source address.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A server system on a chip (SoC) device, comprising:
   one or more processing cores;
   one or more media access control (MAC) units connected to the one or more processing cores, wherein each of the one or more MAC units is assigned a domain identifier and a management domain bit, wherein the domain identifier indicates a particular network domain to which each of the one or more MAC units belongs, and wherein the management domain bit indicates access to a management domain, and;
   a fabric switch connected to each of the one or more MAC units, wherein the fabric switch is connected to a plurality of external ports, and wherein the fabric switch is configured to perform packet processing based, at least in part, on the domain identifiers and the management domain bits.

2. The SoC device of claim 1, wherein the management domain comprises a management processor core and a management domain MAC unit.

3. The SoC device of claim 2, wherein the management domain is configured to provide a trusted communication channel between adjacent management processor cores.

4. The SoC device of claim 3, further comprising one or more routing header units, wherein each of the one or more routing header units is connected to a separate MAC unit, wherein each of the one or more routing header units is configured to prepend routing heads to packets generated by its respective separate MAC unit, and wherein the routing heads include the domain identifier and the management domain bit associated with the separate MAC unit.

5. The SoC device of claim 2, wherein the management processor core is configured to perform encryption, and wherein a set of encryption keys for the encryption are configured not to leave the management domain.

6. The SoC device of claim 1, wherein the domain identifier is five bits.

7. The SoC device of claim 1, wherein the fabric switch is further configured to stop a packet that has been assigned a default domain identifier.

8. The SoC device of claim 1, wherein the fabric switch is further configured to stop a packet with a domain identifier that was not assigned to the one or more MAC units.

9. The SoC device of claim 1, wherein each packet in the management domain is marked as a management domain packet so that the management domain packets are tunneled.

10. The SoC device of claim 1, wherein the packet processing comprises intrusion detection, intrusion prevention, sFlow monitoring, packet routing, deep packet inspection, packet logging, transparent virtual private network encapsulation, packet encryption and decryption, packet compression and decompression, or IP reputation.

11. The SoC device of claim 1, wherein at least one of the domain identifiers is assigned to a first user, and wherein at least one of the one or more MAC units is configured to accept a plurality of packets for the first user, but drop packets for a second user.

12. The SoC device of claim 1, further comprising a secure network attached storage device.

13. A method for secure communication in a data center, the method comprising:
    interconnecting a plurality of nodes with a plurality of links to form a server fabric, wherein each of the plurality of nodes includes:
        one or more media access control (MAC) units, wherein each of the one or more MAC units is assigned a domain identifier and a management domain bit, wherein the domain identifier indicates a particular network domain to which each of the one or more MAC units belongs, and wherein the management domain bit indicates access to a management domain; and
        a fabric switch connected to each of the one or more MAC units, wherein the fabric switch is further connected to the plurality of links;
    generating, by the MAC units on the plurality of nodes, data packets; and
    routing, by the fabric switches on the plurality of nodes, the data packets in the server fabric based at least in part on the domain identifiers and the management domain bits.

14. The method of claim 13, further comprising:
    assigning a first user to a first node in the server fabric;
    assigning a first domain identifier to the one or more MAC units on the first node;
    assigning a second user to a second node in the server fabric;
    assigning a second domain identifier to the one or more MAC units on the second node;
    accepting, by only the first node, a plurality of data packets for the first user based on the first domain identifier; and
    accepting, by only the second node, a plurality of data packets for the second user based on the second: domain identifier.

15. The method of claim 13, further comprising:
    providing each of the plurality of nodes with a management domain that includes a management processor core, a management domain MAC unit, and a unique domain identifier assigned to the management domain MAC unit; and
    sending, by a first management domain of a first node to a second management domain of a second node, a plurality of data packets.

16. The method of claim 15, further comprising marking each packet in the management domain as a management domain packet so that management domain packets are tunneled.

17. The method of claim 13, further comprising:
    providing a gateway node that connects the plurality of nodes to at least one port, wherein the gateway node includes:
        an application processor that performs packet processing;
        a first MAC unit assigned to the at least one port, wherein the at least one port has external data traffic; and
        a second MAC unit assigned to internal data traffic;
    routing the external data traffic from the first MAC unit to the second MAC unit; and
    processing, by the application processor, the external data traffic to perform an intrusion detection or an intrusion prevention.

18. The method of claim 17, further comprising processing, by the application processor, the external data traffic to perform sFlow monitoring, packet routing, deep packet inspection, packet logging, transparent virtual private network encapsulation, packet encryption and decryption, packet compression and decompression, or IP reputation.

19. The method of claim 13, further comprising:
    assigning a selected node of the plurality of nodes to packet processing; and
    performing, by an application processor in the selected node, an intrusion detection or an intrusion prevention.

20. The method of claim 19, further comprising performing, by the application processor in the selected node, sFlow monitoring, packet routing, deep packet inspection, packet logging, transparent virtual private network encapsulation, packet encryption and decryption, packet compression and decompression, or IP reputation.

21. The method of claim 13, further comprising:
    providing at least one of the plurality of nodes with a management domain that includes a management processor core, a management domain MAC unit connected to the management processor core, and a unique domain identifier assigned to the management domain MAC unit, wherein the management domain is secure;
    replicating, based on a promiscuous vector, data packets to the management domain MAC unit; and
    processing the data packets by the management processor core to perform an intrusion detection or an intrusion prevention.

22. The method of claim 21, further comprising performing, by the management processor core, sFlow monitoring, packet routing, deep packet inspection, packet logging, transparent virtual private network encapsulation, packet encryption and decryption, packet compression and decompression, or IP reputation.

23. The method of claim 13, further comprising:
    initializing, by a network manager unit that manages the plurality of nodes, a content addressable memory in each of the plurality of nodes with a list of allowed MAC addresses; and dropping, at each of the plurality of nodes, a data packet whose address does not match the list of allowed MAC addresses.

24. The method of claim 13, further comprising establishing a secure domain between a first node and a second node in the plurality of nodes, wherein the first node and the second node each include a network attached storage.

25. The method of claim 13, further comprising:
providing, for each of the plurality of nodes, a management domain that includes a management processor core, wherein the management domain is secure; and
monitoring, by the management processor core, a rate of data packets through the respective node.

26. The method of claim 13, further comprising configuring, by a network manager unit that manages the plurality of nodes, a topology of the plurality of links.

27. The method of claim 13, wherein at least one of the plurality of nodes comprises a management domain that includes a management processor core, and the method further comprising performing, by the management processor core, packet processing.

28. The method of claim 27, wherein the packet processing includes intrusion detection, intrusion prevention, sFlow monitoring, packet routing, deep packet inspection, packet logging, transparent virtual private network encapsulation, packet encryption and decryption, packet compression and decompression, or IP reputation.

29. The method of claim 13, wherein at least one of the plurality of nodes comprises a management domain that includes a management processor core, wherein the management domain is secure, and the method further comprising:
performing, by the management processor, encryption of data packets; and
storing a set of encryption keys for the encryption in the management domain.

30. A server fabric, comprising:
a plurality of nodes, wherein each node in the plurality of nodes includes:
one or more media access control (MAC) units, wherein each of the one or more MAC units is assigned a domain identifier and a management domain bit, wherein the domain identifier indicates a particular network domain to which each of the one or more MAC units belongs, and wherein the management domain indicates access to a management domain; and
a fabric switch connected to each of the one or more MAC units; and
a plurality of links that interconnect the plurality of nodes to form the server fabric;
wherein the fabric switches are configured to route data packets in the server fabric based, at least in part, on the domain identifiers and the management domain bits.

31. The server fabric of claim 30, wherein a first user is assigned to a first node in the server fabric and a first domain identifier is assigned to the one or more MAC units on the first node, wherein a second user is assigned to a second node in the server fabric and a second domain identifier is assigned to the one or more MAC units on the second node, wherein the first node is configured to accept a plurality of data packets for the first user based on the first domain identifier and reject a plurality of packets for the second user, and wherein the second node is configured to accept the plurality of data packets for the second user and reject the plurality of packets for the first user.

32. The server fabric of claim 31, wherein each of the plurality of nodes comprises at least one routing header unit configured to route data packets, and wherein the at least one routing header unit includes a constrained routing table that indicates that the plurality of data packets for the second user are not routed to the first node assigned to the first user.

33. The server fabric of claim 30, wherein each of the plurality of nodes comprises a management domain that includes a management processor core, a management domain MAC unit, and a unique domain identifier assigned to the management domain MAC unit.

34. The server fabric of claim 33, wherein each packet in the management domain is marked as a management domain packet so that management domain packets are tunneled.

35. The server fabric of claim 30, further comprising a gateway node that connects the plurality of nodes to at least one port, wherein the gateway node includes:
an application processor configured to perform packet processing;
a first MAC unit assigned to the at least one port, wherein the at least one port has external data traffic; and
a second MAC unit assigned to internal data traffic;
wherein the gateway node is configured to route the external data traffic from the first MAC unit to the second MAC unit, and wherein the application processor is further configured to process the external data traffic to perform an intrusion detection or an intrusion prevention.

36. The server fabric of claim 35, wherein the application processor is further configured to perform sFlow monitoring, packet routing, deep packet inspection, packet logging, transparent virtual private network encapsulation, packet encryption and decryption, packet compression and decompression, or IP reputation.

37. The server fabric of claim 30, wherein a selected node of the plurality of nodes is assigned to packet processing, and wherein the selected node includes an application processor configured to perform an intrusion detection or an intrusion prevention.

38. The server fabric of claim 37, wherein the application processor of is further configured to perform sFlow monitoring, packet routing, deep packet inspection, packet logging, transparent virtual private network encapsulation, packet encryption and decryption, packet compression and decompression, or IP reputation.

39. The server fabric of claim 30, wherein at least one of the plurality of nodes comprises a management domain that includes a management processor core, a management domain MAC unit connected to the management processor core, and a unique domain identifier assigned to the management domain MAC unit, wherein the management domain is secure, wherein the plurality of links include a promiscuous vector that is configured to replicate data packets to the management domain MAC unit, and wherein the management processor core is configured to processes packets to perform an intrusion detection or an intrusion prevention.

40. The server fabric of claim 39, wherein the management processor core is further configured to perform sFlow monitoring, packet routing, deep packet inspection, packet logging, transparent virtual private network encapsulation, packet encryption and decryption, packet compression and decompression, or IP reputation.

41. The server fabric of claim 30, further comprising a network manager unit configured to manage the plurality of nodes, wherein each of the plurality of nodes comprises a content addressable memory, wherein the network manager unit is further configured to initialize the content addressable memory in each of the plurality of nodes with a list of allowed MAC addresses, and wherein the plurality of nodes are configured to drop a data packet whose address does not match the list of allowed MAC addresses.

42. The server fabric of claim 30, wherein a first node and a second node in the plurality of nodes each include a network attached storage, and wherein a secure domain is established between the first node and the second node.

43. The server fabric of claim 30, wherein at least one of the plurality of nodes comprises a management domain that includes a management processor core, wherein the management domain is secure, and wherein the management processor core is configured to monitor a rate of data packets through the at least one of the plurality of nodes.

44. The server fabric of claim 30, further comprising a network manager unit configured to manage the plurality of nodes, wherein the network manager unit is further configured to set up a topology of the plurality of links.

45. The server fabric of claim 30, wherein at least one of the plurality of nodes comprises a management domain that includes a management processor core, wherein the management domain is secure, and wherein the management processor core is configured to perform packet processing.

46. The server fabric of claim 45, wherein the packet processing comprises intrusion detection, intrusion prevention, sFlow monitoring, packet routing, deep packet inspection, packet logging, transparent virtual private network encapsulation, packet encryption and decryption, packet compression and decompression, or IP reputation.

47. The server fabric of claim 30, wherein at least one of the plurality of nodes comprises a management domain that includes a management processor core, wherein the management domain is secure, wherein the management processor core is configured to perform encryption, and wherein a set of encryption keys for the encryption are configured not to leave the management domain.

* * * * *